March 17, 1970   M. J. WHARMBY   3,500,606
METHOD OF JOINING FLAT SECTIONS OF MOULDED PLASTICS
Filed Feb. 23, 1968   2 Sheets-Sheet 1

March 17, 1970   M. J. WHARMBY   3,500,606
METHOD OF JOINING FLAT SECTIONS OF MOULDED PLASTICS
Filed Feb. 23, 1968   2 Sheets-Sheet 2

INVENTOR:
Martin John Wharmby
BY Cushman, Darby
& Cushman
ATTORNEYS

United States Patent Office 3,500,606
Patented Mar. 17, 1970

3,500,606
METHOD OF JOINING FLAT SECTIONS OF MOULDED PLASTICS
Martin John Wharmby, Dunstable, England, assignor to Thermo Plastics Limited, Dunstable, England
Filed Feb. 23, 1968, Ser. No. 707,704
Claims priority, application Great Britain, Feb. 24, 1967, 8,812/67
Int. Cl. E04c 1/30; A63h 33/08
U.S. Cl. 52—589                                1 Claim

ABSTRACT OF THE DISCLOSURE

A flooring unit adapted to be joined to other units to form a flooring assembly comprises a plane polygon of plastics material having flanges on at least some of its edges, the flanges being provided with keyhole shaped slots and holes. The units are joined together by way of studs.

---

This invention relates to flooring units of plastics materials which are adapted to be joined together, side by side.

Floor slats have been known for some time and are used industrially on floors if they are likely to be wet, e.g. in swimming baths, food processing plants, trawlers and the like and also in shower baths and as duck boards on grass, e.g. outside caravans. These known slats are usually joined together by nuts and bolts.

According to the present invention there is provided a flooring unit comprising a plane polygon of plastics material, a flange on at least some of the sides of the polygon, at least some of the flanges being formed with peripherally spaced keyhole slots or holes and keyhole slots.

The invention also comprises a flooring assembly comprising a plurality of flooring units as defined above and further comprising a stud member having a shank portion dimensioned to pass through the slot portion of a keyhole slot as a push fit and a head at each end of the shank portion, each head being of greater diameter than the hole diameter or the diameter of the enlarged part of the keyhole slot, said stud member having one of said heads passed through a hole in the flange of one unit to engage by way of an opposed keyhole slot behind the flange of an adjoining unit with the shank of the stud member traversing said slot and the other of said heads retained behind said hole.

In order to join two or more units together, a stud is fitted to the hole on at least one flange of each unit to be joined and the keyhole slot in said flange is fitted over the shank portion of the stud in the opposing hole of the flange of the other section.

The shank section of the stud is preferably a sliding fit in each hole and in the circular portion of each keyhole slot. Each hole is preferably countersunk so that the plug may be retracted when not being used for joining to another unit, or during transportation of the units.

When the units are of the preferred rectangular configuration they may be joined in a linear or chessboard arrangement.

Figure 1:
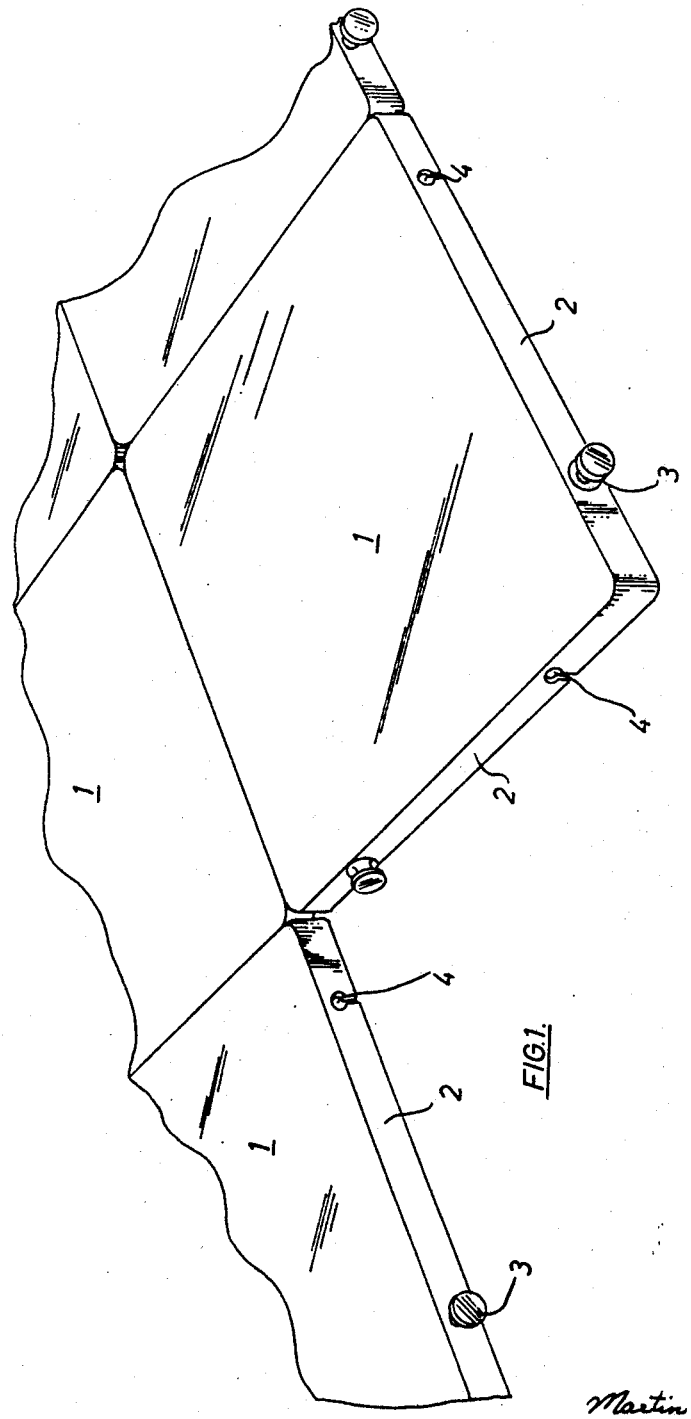
Figure 2:
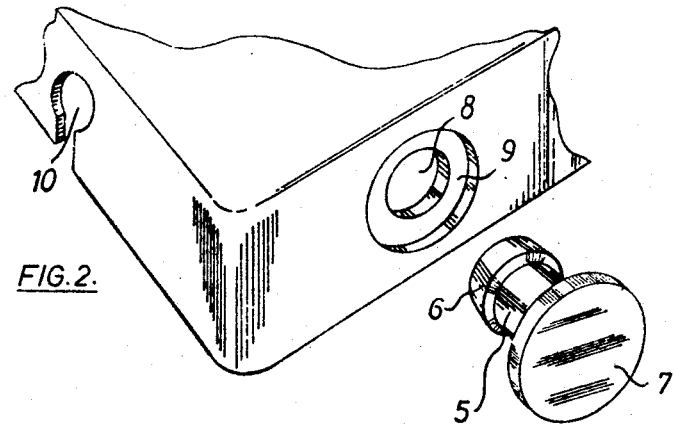
Figure 3:
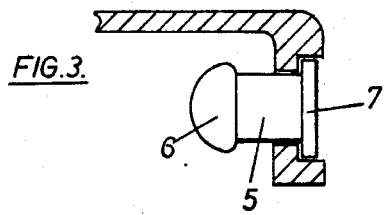
Figure 4:
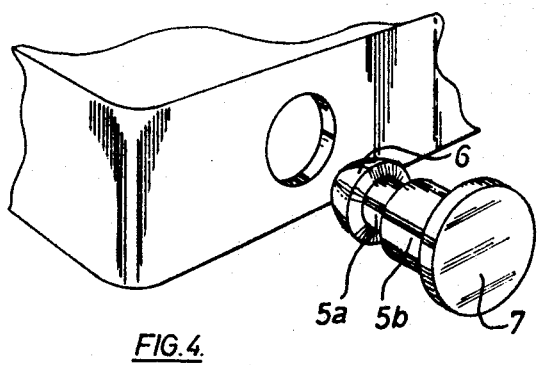

The invention will be further illustrated, by way of example, by reference to the accompanying drawings, in which FIGURE 1 shows a number of flooring units joined together, FIGURE 2 shows a hole and stud, FIGURE 3 shows a cross-section of a stud recessed in a hole, and FIGURE 4 shows an alternative form of stud.

Referring now to FIG. 1 a number of flat polygons of moulded plastics material 1 have vertical flanges 2 in each of which is a hole containing stud 3, and a keyhole shaped slot 4 for receiving the shank of a stud. The holes and slots may be incorporated in the flanges during moulding or can be made by machining after moulding the sections.

FIG. 2 shows a hole 8 having recessed portion 9. The stud comprises a rounded head 6 and a flat head 7 each having a larger diameter than shank 5. Round head 6 is such that it can be pressed through hole 8 but cannot easily be withdrawn. Flat head 7 fits into recessed portion 9 and shank 5 is a sliding fit in hole 8. The stud in this position is shown in FIG. 3.

Keyhole shaped slot 10 is such that shank 5 is a loose fit in the circular portion but will only pass through the narrow portion under pressure.

An alternative form of stud is shown in FIG. 4. The shank is in two parts 5a and 5b, 5a having a smaller diameter than 5b. The narrow part 5a is such that it easily passes through the narrow part of the keyhole slot and part 5b is such as to form a loose fit in the circular part of the slot.

The studs are preferably of plastics material and may be made by moulding or turning. The length of the shank is preferably about twice the thickness of flange 2 (FIG. 1) so that the sections may be rigidly joined together.

The flat units may be transported without studs, which may be inserted into the holes when received on the site for laying. Alternatively the units may be transported with the studs inserted in the position shown in FIG. 3. In this way the studs are not broken during transport. After insertion of the studs they are drawn forward by finger pressure just before the flat unit is laid. Flat units are laid so that the shanks of the studs in the adjacent flat units are adjacent to the wide portions of the keyhole shaped slots 4 (FIG. 1). The stud shanks are then pressed home into the keyhole by pressure on the flat units.

In this way flooring can readily be connected in rows or squares without using separate fixings such as nuts and bolts. Once fitted the studs are immediately available for connection use by finger pressure or can be equally easily retracted.

The surface of the flooring units may be slatted, ornamented or uninterrupted.

The floor units may be made of a polyolefine, preferably polyethylene, or polyvinyl chloride. The stud is preferably made of the same material as the floor unit but may be of any elastomeric material, e.g. natural or synthetic rubber.

In order that the stud may be inserted into a hole, either the stud or the floor unit, or both should be resilient. If the stud and floor unit are made of the same material, then they will both be resilient.

I claim:
1. A flooring assembly comprising a plurality of plane rectangular units, each of said rectangular units having a flange on each side thereof, one hole being defined in each flange intermediate the edges thereof, one keyhole shaped slot being defined in each flange and having an entrance portion extending from a free edge of the flange and an enlarged terminal portion positioned intermediate the edges thereof, said holes and said slots having the same relative positions in flanges of congruent configuration; a stud member having a shank portion with a length of about twice the thickness of each flange and a diameter such as to pass through the entrance portion of said keyhole shaped slots as a push fit, said stud member having a first head and a second head, said heads being at opposite ends of said shank portion, said first head being greater in diameter than the hole diameter and said second head being greater in diameter than the enlarged terminal portion of the keyhole shaped slot, said shank of said stud member transversing said hole and said slot with said first head of said stud member being retained by a portion of one of said flanges adjacent the hole so as to be axially slidable from a retracted position prior to assembly to protect said stud against breakage to an extended position for assembly and said second head being retained by a portion of one of said flanges adjacent the enlarged terminal portion of the keyhole slot of an adjoining rectangular unit.

References Cited

UNITED STATES PATENTS

| | | | |
|---|---|---|---|
| 1,556,233 | 10/1925 | Maise | 52—511 |
| 1,782,239 | 11/1930 | Ledwinka | 52—511 |
| 1,912,416 | 6/1933 | Van Ausdol | 52—511 |
| 2,487,654 | 11/1949 | Hoffman et al. | 46—26 |
| 2,940,760 | 6/1960 | Brinkman | 46—24 |

FOREIGN PATENTS

| | | |
|---|---|---|
| 1,089,076 | 12/1954 | France. |
| 1,152,008 | 8/1957 | France. |
| 442,661 | 12/1948 | Italy. |
| 49,216 | 1966 | Germany. |

HENRY C. SUTHERLAND, Primary Examiner

J. L. RIDGILL, JR., Assistant Examiner

U.S. Cl. X.R.

46—25; 52—392, 594; 206—42